(12) United States Patent
Schiavone

(10) Patent No.: US 6,296,260 B1
(45) Date of Patent: Oct. 2, 2001

(54) SUPPLEMENTAL WHEEL FOR A GOLF BAG CART

(76) Inventor: Dominick M. Schiavone, 2551 Martin Ave., Bellmore, NY (US) 11710

( * ) Notice: Subject to any disclaimer, the term of this patent is extended or adjusted under 35 U.S.C. 154(b) by 0 days.

(21) Appl. No.: 09/663,261

(22) Filed: Sep. 15, 2000

Related U.S. Application Data

(60) Provisional application No. 60/154,342, filed on Sep. 16, 1999.

(51) Int. Cl.$^7$ .................................................. B62B 1/00
(52) U.S. Cl. .................... 280/47.2; 280/DIG. 6; 188/68; 188/19
(58) Field of Search .................... 280/47.2, 47.24, 280/47.26, 47.27, DIG. 6, 646, 62; 188/68, 19; 16/29, 30, 18 A

(56) References Cited

U.S. PATENT DOCUMENTS

| | | | |
|---|---|---|---|
| D. 350,426 | * 9/1994 | Liao et al. | D34/15 |
| D. 362,103 | * 9/1995 | Schnoll | D34/15 |
| 4,073,356 | * 2/1978 | Schlicht | 180/15 |
| 4,870,715 | * 10/1989 | Schnuell | 16/35 R |
| 5,167,389 | * 12/1992 | Reimers | 248/96 |
| 6,059,300 | * 5/2000 | Wu | 280/47.2 |
| 6,131,917 | * 10/2000 | Walsh | 280/DIG. 6 |
| 6,152,465 | * 11/2000 | Shieh | 280/62 |

\* cited by examiner

*Primary Examiner*—Brian L. Johnson
*Assistant Examiner*—Gerald Klebe
(74) *Attorney, Agent, or Firm*—Goldstein Law Offices, P.C.

(57) ABSTRACT

A supplemental wheel for a golf bag cart including a mounting block that is securable to a lower bag support of a golf bag cart. The mounting block has a generally rectangular configuration defined by a short top wall, a short bottom wall, long opposed front and rear walls, and right and left side faces. The mounting block includes an angular cut-out extending from the short bottom wall through the long rear wall. The short top wall is securable to the lower bag support whereby the cut-out is disposed in an essentially parallel relationship with a recipient surface that the golf bag cart is position on. A swivel wheel assembly is secured to the cut-out formed on the mounting block. The swivel wheel has a braking mechanism coupled therewith.

2 Claims, 2 Drawing Sheets

SUPPLEMENTAL WHEEL FOR A GOLF BAG CART

CROSS REFERENCES AND RELATED SUBJECT MATTER

This application relates to subject matter contained in provisional patent application serial No. 60/154,342, filed in the United States Patent Office on Sep. 16, 1999.

BACKGROUND OF THE INVENTION

The present invention relates to a supplemental wheel for a golf bag cart and more particularly pertains to allowing for smoother transport of a golf bag cart while preventing accidental damage to a golf course.

Although the amount of golfers who walk an entire round of golf has decreased due to the existence of motorized riding carts, many golfers still desire the exercise that is associated with walking the golf course. Most of the golfers who walk the course generally use a golf bag cart that allows them to transport their golf bag without having to carry it.

The typical golf bag cart includes a pair of wheels coupled with a frame. The frame has a handle to allow the golfer to pull the cart. A lower support stand is secured to the frame to support the bag in an upright orientation when not being moved. This support stand sometimes accidentally gets dragged on the golf course during movement of the cart resulting in unwanted damage occurring to the fairways and rough.

What is needed is a way to prevent these support stands from accidentally damaging the golf course.

The present invention attempts to solve the abovementioned problem by providing a swivel wheel and associated mounting bracket that can be secured to a support stand of a golf bag cart which will allow the golf bag cart to be rolled entirely on three wheels without risk of damage occurring to the golf course.

The use of golf bag carts is known in the prior art. More specifically, golf bag carts heretofore devised and utilized for the purpose of transporting golf bags are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,167,389 to Reimers discloses a golf bag cart with a caster.attached to the bag bottom support member. U.S. Pat. No. Des. 350,426 to Liao and Des. 362,103 to Schnoll disclose ornamental designs for golf carts that appear to have third wheel assemblies.

While these devices fulfill their respective, particular objective and requirements, the aforementioned patents do not describe a supplemental wheel for a golf bag cart for allowing for smoother transport of a golf bag cart while preventing accidental damage to a golf course.

In this respect, the supplemental wheel for a golf bag cart according to the present invention substantially departs from the conventional concepts and designs of the prior art, and in doing so provides an apparatus primarily developed for the purpose of allowing for smoother transport of a golf bag cart while preventing accidental damage to a golf course.

Therefore, it can be appreciated that there exists a continuing need for a new and improved supplemental wheel for a golf bag cart which can be used for allowing for smoother transport of a golf bag cart while preventing accidental damage to a golf course. In this regard, the present invention substantially fulfills this need.

SUMMARY OF THE INVENTION

In the view of the foregoing disadvantages inherent in the known types of golf bag carts now present in the prior art, the present invention provides an improved supplemental wheel for a golf bag cart. As such, the general purpose of the present invention, which will be described subsequently in greater detail, is to provide a new and improved supplemental wheel for a golf bag cart and method which has all the advantages of the prior art and none of the disadvantages.

To attain this, the present invention works in conjunction with a golf,bag cart comprised of a frame member having upper and lower bag supports. The frame member has a pair of wheels collapsibly disposed on opposing sides thereof. The frame member has a handle extending upwardly therefrom. The invention then, comprises a mounting block which is secured to the lower bag support of the cart. The mounting block has a generally rectangular configuration defined by a short top wall, a short bottom wall, long opposed front and rear walls, ahd right and left side faces. The mounting block includes an angular cut-out extending from the short bottom wall-through the long rear wall. The short top wall is securable to the lower bag support whereby the cut-out is disposed in an essentially parallel relationship with a recipient surface that the golf bag cart is positioned on. A swivel wheel is secured to the cut-out formed on the mounting block. The swivel wheel has a braking mechanism coupled therewith.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved supplemental wheel for a golf bag cart which together with the cart has all the advantages of the prior art golf bag carts and none of the disadvantages.

It is another object of the present invention to provide a new and improved supplemental wheel for a golf bag cart which may be easily and efficiently manufactured and marketed.

It is a further object of the present invention to provide a new and improved supplemental wheel for a golf bag cart which is of durable and reliable construction.

An even further object of the present invention is to provide a new and improved supplemental wheel for a golf bag cart which is susceptible of a low cost of manufacture with regard to both materials and labor, and which accordingly is then susceptible of low prices of sale to the consuming public, thereby making such a supplemental wheel for a golf bag cart economically available to the buying public.

Even still another object of the present invention is to provide a new and improved supplemental wheel for a golf bag cart for allowing for smoother transport of a golf bag cart while preventing accidental damage to a golf course.

Lastly, it is an object of the present invention to provide a new and improved supplemental wheel for a golf bag cart including a mounting block that is securable to a lower bag support of a golf bag cart. The mounting block has a generally rectangular configuration defined by a short top wall, a short bottom wall, long opposed front and rear walls, and right and left side faces. The mounting block includes an angular cut-out extending from the short bottom wall through the long rear wall. The short top wall is securable to the lower bag support whereby the cut-out is disposed in an essentially parallel relationship with a recipient surface that the golf bag cart is position on. A swivel wheel is secured to the cut-out formed on the mounting block. The swivel wheel has a braking mechanism coupled therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
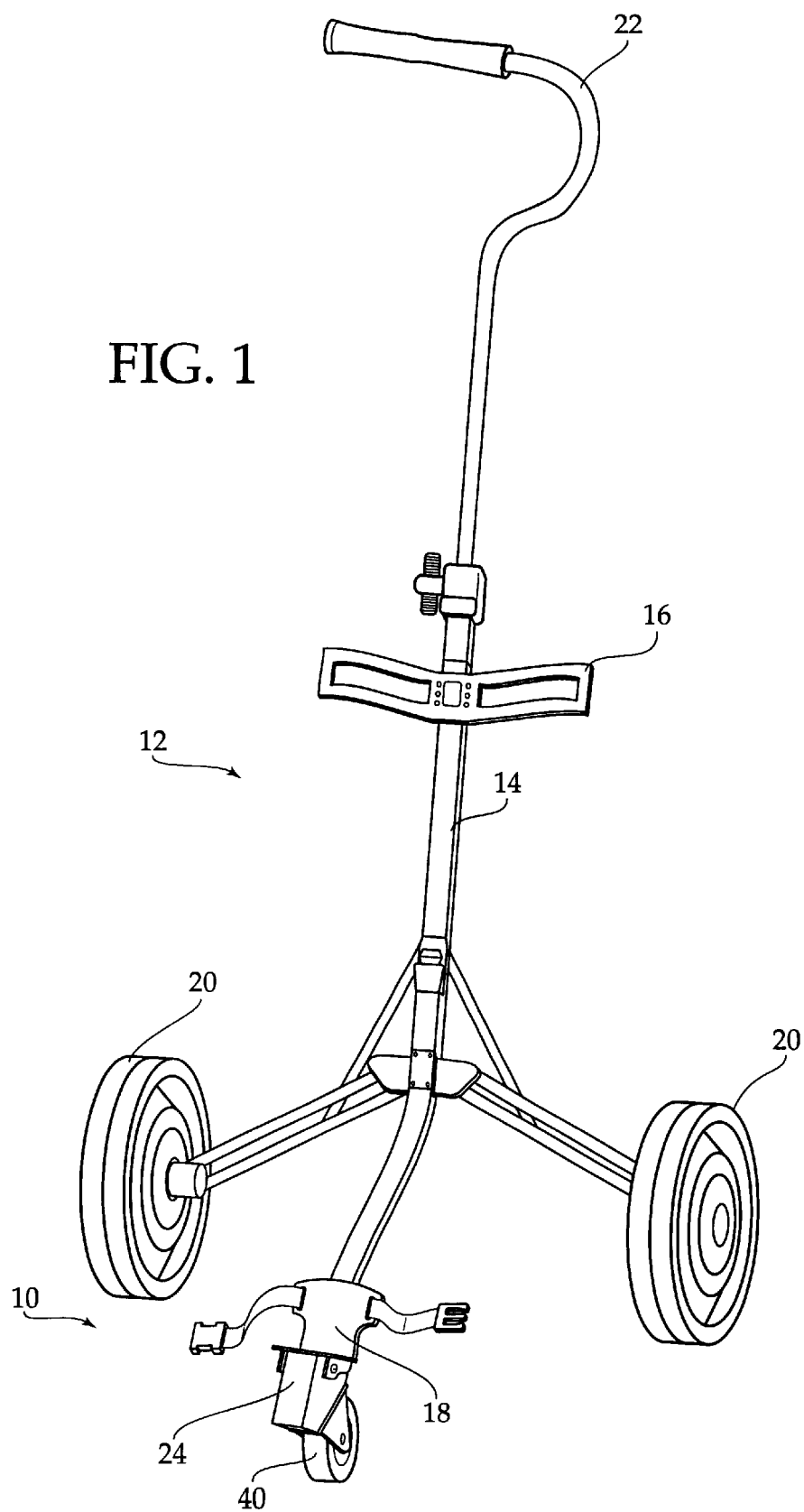
FIG. 1 is a perspective view of the preferred embodiment of the supplemental wheel for a golf bag cart to constructed in accordance with the principles of the present invention.
Figure 2:
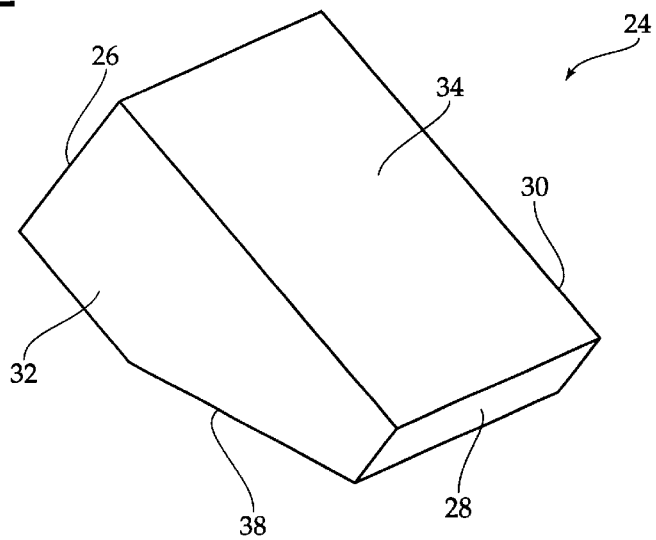
FIG. 2 is a perspective view of the mounting block of the present invention.
Figure 3:
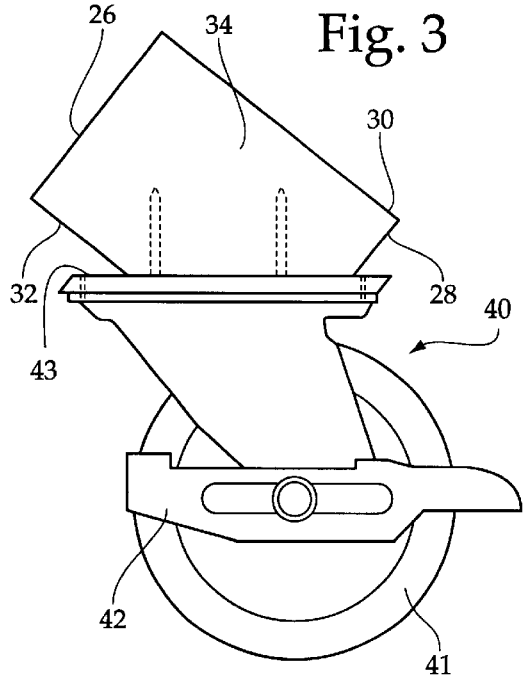
FIG. 3 is a first side view of the swivel wheel of the present invention.
Figure 4:
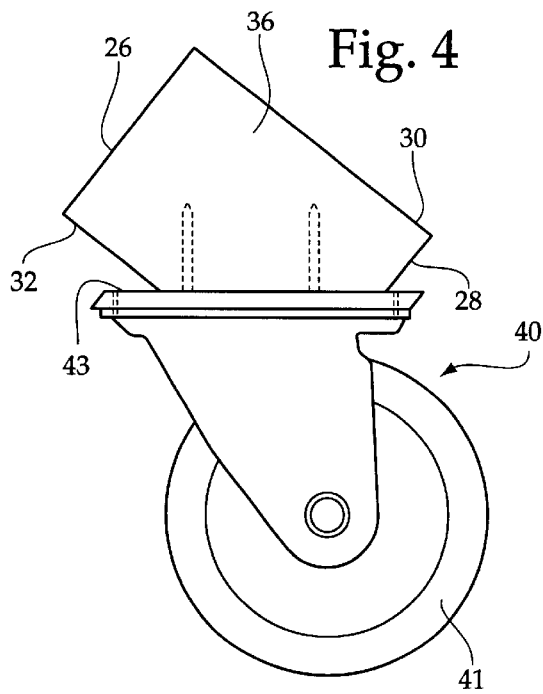
FIG. 4 is a second side view of the swivel wheel of the present invention.

With reference now to the drawings, and in particular, to FIGS. 1 through 4 thereof, the preferred embodiment of the new and improved supplemental wheel for a golf bag cart embodying the principles and concepts of the present invention and generally designated by the reference number 10 will be described.

Specifically, it will be noted in the various Figures that the device relates to a supplemental wheel for a golf bag cart for allowing for smoother transport of a golf bag cart 12 while preventing accidental damage to a golf course. In its broadest context, the device comprises, a mounting block 24 and a swivel wheel assembly 40. Such components are individually configured and correlated with respect to each other so as to attain the desired objective in conjunction with the golf bag cart.

The golf bag cart 12 is comprised of a frame member 14 having an upper bag support 16 and a lower bag supports 18. The frame member 14 has a pair of main wheels 20 collapsibly disposed on opposing sides thereof. The frame member 14 has a handle 22 extending upwardly therefrom. Typically, the lower bag support 18 will rest on the ground of a golf course when in an upright orientation.

The mounting block 24 is secured to the lower bag support 18. The mounting block 24 has a generally rectangular configuration defined by a short top wall 26, a short bottom wall 28, long opposed front and rear walls 30,32, and right and left side faces 34,36. The mounting block 24 includes an angular cutout 38 extending from the short bottom wall 28 through the long rear wall 32. The short top wall 26 is securable to the lower bag support 18 whereby the cut-out 38 is disposed in an essentially parallel relationship with a ground surface that the golf bag cart 12 is positioned upon.

The swivel wheel assembly 40 includes a swivel wheel 41 and a mounting plate 43. The mounting plate 43 is secured to the cut-out 38 formed on the mounting block 24, preferably using screws which penetrate deeply into the mounting block 24. The swivel wheel assembly 40 has a braking mechanism 42 coupled with the swivel wheel 41, mounted coaxially with said swivel wheel 41. The use of the swivel wheel 41 will provide for easier maneuverability of the golf bag cart 12. The braking mechanism 42 can be employed to prevent the golf bag cart 12 from rolling when unattended. A standard golf bag cart will not be equipped with, nor need, a brake because the support stand has a sufficient frictional interaction with the ground surface so as to prevent unattended rolling.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A supplemental wheel for a golf bag cart for allowing smoother transport of a golf bag cart while preventing accidental damage to a golf course ground surface, the golf bag cart comprised of a frame member having upper and lower bag supports, the frame member having a pair of main wheels disposed on opposing sides thereof, the frame member having a handle extending upwardly therefrom, comprising:

a mounting block securable to the lower bag support, the mounting block having a generally rectangular configuration defined by a short top wall, a short bottom wall, long opposed front and rear walls, and right and left side faces, the mounting block including an angular cut-out extending from the short bottom wall through the long rear wall, the short top wall being securable to the lower bag support whereby the cut-out is disposed in an essentially parallel relationship with the ground surface that the golf bag cart is positioned upon; and a swivel wheel assembly secured to the cut-out formed on the mounting block, the swivel wheel assembly including a swivel wheel and a braking mechanism coupled coaxially with the swivel wheel.

2. A supplemental wheel for a golf bag cart having a lower bag support, for allowing for smoother transport of a golf bag cart while preventing accidental damage to a golf course comprising, in combination:

a mounting block securable to the lower bag support of the golf bag cart, the mounting block having a generally rectangular configuration defined by a short top wall, a short bottom wall, long opposed front and rear walls, and right and left side faces, the mounting block including an angular cut-out extending from the short bottom wall through the long rear wall, the short top wall being securable to the lower bag support whereby the cut-out is disposed in an essentially parallel relationship with a recipient surface that the golf bag cart is position on; and a swivel wheel assembly secured to the cut-out formed on the mounting block, the swivel wheel assembly having a swivel wheel, and a braking mechanism coupled therewith.

* * * * *